2 Sheets—Sheet 2.
W. E. SAWYER & A. MAN.
Electric Lamp.
No. 205,144. Patented June 18, 1878.
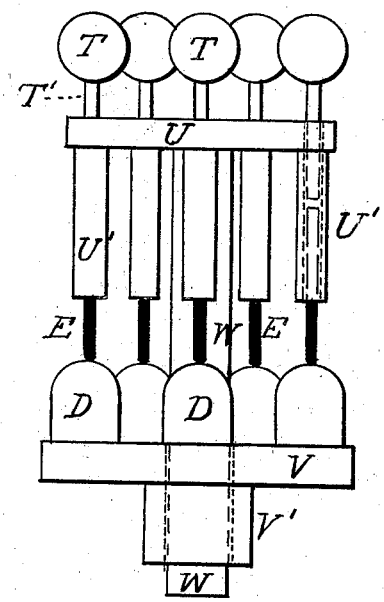
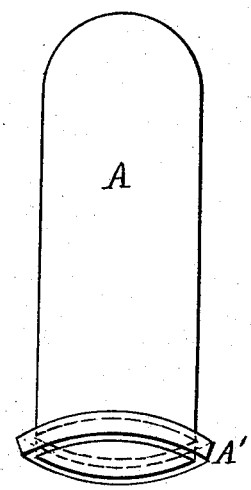
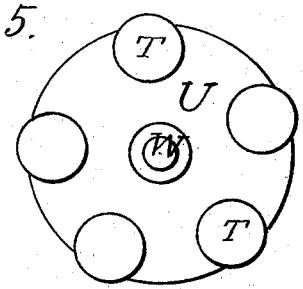
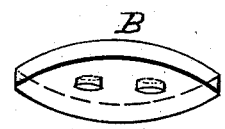
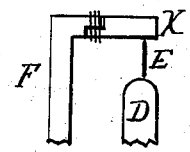
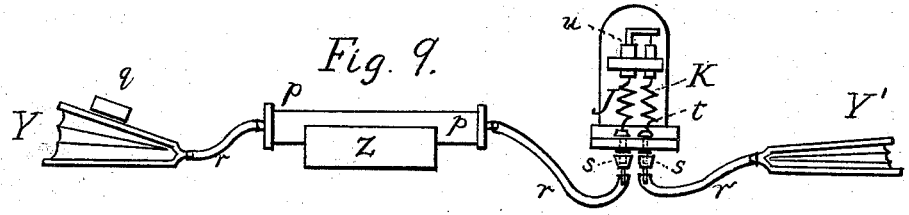
Witnesses:
Wm H. Church,
George H. Porter
Inventors:
W. E. Sawyer,
Albon Man
N. PETERS, PHOTO-LITHOGRAPHER, WASHINGTON, D. C.

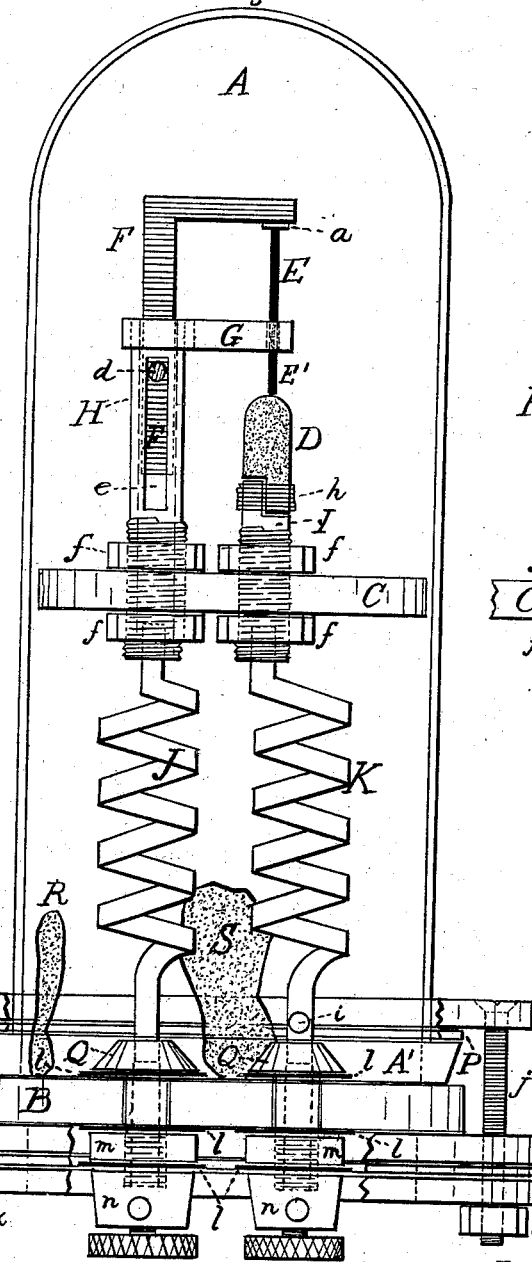

UNITED STATES PATENT OFFICE.

WILLIAM E. SAWYER, OF NEW YORK, AND ALBON MAN, OF BROOKLYN, N. Y.

IMPROVEMENT IN ELECTRIC LAMPS.

Specification forming part of Letters Patent No. 205,144, dated June 18, 1878; application filed May 16, 1878.

*To all whom it may concern:*

Be it known that we, WILLIAM EDWARD SAWYER, of the city, county, and State of New York, and ALBON MAN, of the city of Brooklyn, county of Kings, State of New York, have invented certain new and useful Improvements in Electric Lamps, of which the following is a full, clear, and exact description.

At the present day it is not new to produce a light by causing the electric current to heat a carbon conductor to incandescence in a vacuum, or in nitrogen, or in other gas; but no lamp has yet been devised which would be practically operative, and for these reasons:

First, the methods that have been employed for charging the lamp with the artificial atmosphere, such as the displacement of mercury, water, or air by the gas, or the combustion of phosphorus in the lamp, are imperfect. A perfect vacuum is unattainable. Some oxygen, or other element or compound, remains in the lamp, and slow consumption or disintegration takes place, for the remanent gas or vapor other than nitrogen or hydrogen attacks the carbon, oxygen forming with it carbonic acid or oxide, which in turn is decomposed, with the result of depositing the carbon upon the globe and setting free the oxygen to attack fresh carbon.

Second, it has been found practically impossible under the varying degrees of heat and pressure to maintain perfect joints, and the result is, that expansion of the artificial atmosphere by the heat from the luminous conductor expels a portion of the same, and the contraction of the atmosphere upon cooling causes a portion of the external air to penetrate the globe, thus supplying oxygen, which at the next lighting feeds upon the carbon.

Third, the unequal expansion of the carbon and its holders has resulted in fractures of the former, so that, however perfect the atmosphere in the globe, the lamp has never been permanent.

To obviate these several difficulties is the object of our invention.

To charge our lamp we prefer the employment of nitrogen gas, and this we produce in the lamp by our improved process in a state of great purity.

As a safeguard against an infinitessimal leakage, we prefer to place in our lamps a small quantity of sodium, potassium, or other agent having a great affinity for oxygen, whose oxidization, unlike the oxidization of phosphorus, produces no vapor, but a solid not easily changed by heat.

As an additional safeguard, we prefer to place in our lamps a quantity of freshly-burned lime, so that any traces of carbonic-acid gas, which might suffer the decomposition and depositing hereinbefore mentioned, may be quickly absorbed and rendered harmless.

To make our lamp perfectly air tight, we have recourse to certain fittings to the opening at the base of the globe, which will be described in detail hereinafter.

To guard against great heating and unequal expansions at the joints, which would imperil the sealing of the lamp and soon render it useless, we isolate the incandescent carbon from the lower part of the globe, where the joints are situated, by a disk or diaphragm of some refractory substance, preferably soapstone or porcelain, whereby we prevent all downward radiation of the heat and keep the joints comparatively cool, at the same time that the upper part of the globe may be very hot.

Furthermore, to prevent conduction of the heat from the incandescent carbon to the joints by the metallic connections communicating therewith, we arrange the two conductors leading upward from the base in a spiral, volute, or fluting form, so that we obtain considerable length of conductor in a limited space, and very little of the heat reaches the base.

By means of the several devices shown and described we have succeeded in obtaining a permanently air-tight lamp.

Our arrangement for avoiding fracture of the carbon will be fully described hereinafter.

In the drawings accompanying and forming a part of this specification, Figure 1 is a side view, and Fig. 3 a partial front view, of the lamp. Figs. 2, 6, and 7 are views of parts thereof. In Figs. 4, 5, and 8 we have indicated possible modifications of the lamp; and in Fig. 9 is shown the general arrangement of apparatus for charging the lamp with the artificial atmosphere in which the carbon is preserved.

Referring to Figs. 1 and 3, A is the glass globe, provided with a rim or flange, A', (better shown in Fig. 6,) by means of which it is clamped to the glass base or stopper B. (Better shown in Fig. 7.)

We have shown the globe in the form of a tube closed at one end; but it is clear that its shape may greatly differ from that shown. The glass may be "diamond-cut" to effect diffusion of the light, or translucent to soften it; or the globe may be surrounded by a second globe possessing these characteristics, and a second globe would, in fact, be necessary in a lamp placed out-of-doors or subject to wetting, as the heated globe A, if unprotected, would be in great danger of breakage.

To the base of the globe is ground the glass stopper B (better shown in Fig. 7) with great nicety, in order that the fit may be perfect.

Slipping over the top of the globe A is a brass flange, L, (shown partially cut away,) which bears upon the rim A', to bring the globe firmly down upon the stopper B, the pressure upon the rim of the globe being softened and equalized by the cushioned flange of wood, paper, or other yielding substance, P.

Under the stopper B is placed, first, a flange of wood or other yielding substance, M; second, a flange of spring-rubber, N; and, last, a flange of brass, O, all shown partially cut away. Through all these flanges and the flange L go the bolts $jj$, of which there may be any desired number, so distributed around the circle as to equalize the pressure upon the rim A' and stopper B. The bolts $jj$ are secured, in the usual manner, by nuts $kk$. The flange P softens the pressure upon the rim of the globe A', preventing fracture; the brass flange L yields to any inequalities which may exist; the wooden flange M softens the pressure upon the stopper B, preventing fracture thereof, while it is unaffected by any heat that may there exist; and the rubber flange N, protected from heat, acts as a spring, to yield to slight unequal expansions and maintain a perfect contact between A' and B. The rubber flange may, however, be omitted, and the form of the stopper B may be changed to that of a stopper ground into the end of the globe A, as stoppers are ground into bottles.

In setting up the lamp, we slightly coat the lower ground edge of the rim A' with fir-balsam or some cement, in order the better to insure that hermetical sealing which is indispensable to the preservation of the incandescent conductor.

Through the stopper B are drilled two holes, Fig. 7, through which pass the bolts Q Q, protected or not by a cloth or paper lining. These bolts are tubes, and their function is of the greatest importance. The bolt-heads are accurately fitted to the upper surface of the stopper, and under them, coated with balsam or some cement, are thin paper or tin-foil washers $ll$. The nuts $mm$ are accurately fitted to the under surface of the stopper, and under them are similar washers $ll$, similarly prepared. Thus arranged, the bolts are permanently fixed to the base, and when the lamp is charged with the artificial atmosphere required the binding-posts $nn$, whose set-screws are $oo$, similarly guarded by washers $ll$, are set up upon the bolts' ends, whereby the lamp is hermetically sealed.

Entering the bolt-heads Q Q, so as to form a perfect connection with them, are two tubes, J K, arranged fluting, volutely, or spirally, as desired, the tube K being closed at the top, but provided with an opening, $i$, and the tube J being continuous, so that communication with the top of the lamp, when the binding-posts $nn$ are removed, is by way of the tube J, and to the base of the lamp by tube K at the point $i$. The object of this arrangement will hereinafter be made apparent.

C is a disk of soap-stone, porcelain, or other refractory substance not readily fractured by heat, which almost entirely fills the globe A at or near the middle thereof. This, like the glass stopper B, is perforated with two holes, through which pass the metal tube H and the metal rod I, both of which are provided with a screw-thread at their lower ends. The tube H and the rod I are firmly fixed to the disk by means of nuts $ffff$, as will be comprehended without further explanation. Into the lower ends of H and I, and firmly fixed thereto in any manner whatsoever, enter the conducting-tubes J and K. Let into the rod I is a short stick of carbon, D, rounded at the top, which we prefer to fasten to the rod by winding around the two the naked wire $h$, which may be of copper, silver, or platina.

Sliding up and down in the tube H is a rod, F, bent at right angles at the top, so as to bring the extremity on a line above the carbon D. The rod F is prevented from turning in the tube H by the pin $d$, fixed to the rod and working in the slot $e$.

The light is produced by the heating of the small carbon rod E at the point E', between the clamp G and the top of carbon D, connection with the small carbon E being had both through clamp G and the platina piece $a$ on bent rod F. The rod F exerts a pressure upon the carbon E, which continues the same without regard to the length of the carbon, and thus, should fracture or a slight consumption of the carbon occur at the first lighting or any subsequent lighting of the lamp, the necessity of taking down the same, renewing the carbon, and recharging the globe is obviated, inasmuch as the weight of the rod F gently forces the carbon through the clamp G until a new contact between E and D is established. The construction of the clamp G is shown in Fig. 2, which is a top view of the same. It consists of a copper or silver strip, bent around the tube H and fixed to the same either by a pin or by its own pressure. At the end of the clamp are pinned two pieces of platina or iridium, $bb$, which may or may not touch each other, but each of which is slightly grooved to form an opening, $c$, through which the carbon rod E may pass, and in which it may be held in place. The cross-piece of copper, $g$, pinned to the copper or silver strip, which constitutes the main portion of the clamp, serves the purpose, through its expansibility, of increasing and lessening the distance between the platina pieces b b, according to the degree of heat experienced, thereby in great measure avoiding fracture of the carbon at E' when intensely heated by the current.

In setting up the lamp we prefer to place inside the globe a lump of sodium or potassium, R, and one or more lumps of freshly-burned lime, S, although we do not confine ourselves to the introduction of these substances. Sodium and potassium, being conductors of electricity, may be protected from the conductors to the carbon, if deemed necessary, by inclosing the same in a bag of cloth, or in a glass tube open at one end.

We are aware that phosphorus has been placed in sealed lamps to remove the oxygen by its slow combustion; but the phosphorous acid evolved is not only fatal to the carbon when intensely heated, but beclouds the globe and obscures the light. Neither sodium nor potassium exerts any such deleterious influence, the product of oxidization being a solid incapable, under the circumstances, of yielding either gas or vapor of any kind; hence the use of such by us as a safeguard in the lamp. Should carbonic-acid gas exist, or at any time be evolved in the lamp, it is quickly taken up by the lime, or by the soda or potassa formed by oxidization of the sodium or potassium.

In Figs. 4 and 5 we have indicated a modification of our lamp to the chandelier form. We may arrange any number of carbons D and E around a circle in the form shown in Figs. 1 and 2, having for each a feeding device, F G, the whole being in a single globe; or we may arrange the chandelier as shown in Fig. 4, U being a metal disk, provided with five, or more or less, tubes, U', in which slide the small carbon rods E E, which are forced into contact with the lower carbons D D by the downward pressure of rods T', surmounted by the weights T T. All of the lower carbons D connect with the disk V, to which is fixed tube V', and through this tube and the disk, but insulated therefrom, passes the conductor W, which is attached to the upper disk U, and is therefore in connection with all the small carbons E.

In Fig. 8 we have indicated a modification of the single-carbon lamp, the clamp G being dispensed with, and the bent rod F being provided, like the rod I of Fig. 1, with a carbon piece, X, wired to it precisely as carbon D is wired to rod I.

The lamp being set up, the next important thing is to charge it with the atmosphere, which will prevent consumption of the carbon; and we will now proceed to describe in detail our improved process for so charging the lamp.

The various methods of manufacturing nitrogen gas are well known. Having dried and purified the gas until it stands all tests, we pass it into a dry receiver, preferably a bag of vulcanized rubber.

Referring now to Fig. 9, into a glass tube, p p, in a furnace, Z, by means of which the tube may be heated to any desired extent, we place a quantity of sodium or potassium, or other agent having a great affinity for oxygen, whose oxidization produces a solid. If deemed advisable, we may add to the same a purifying agent or agents. Heat, while not essential, greatly facilitates the operation, and therefore, even with potassium, we prefer to employ the furnace. To one end of the glass tube p p, by means of a flexible tube, r, we attach the receiver Y, filled with nitrogen, and having removed the binding-posts n n, Fig. 1, from the lamp, we connect the other end of the tube p, by means of a flexible tube, r, and nipple s, with the bolt Q, which connects with tube J, leading up to the top of the lamp. We then, by means of weight q, force a sufficient quantity of the nitrogen through the tube p and the lamp to greatly dilute and mostly displace the atmospheric air contained therein. The empty closed receiver Y' we then attach, by a flexible tube, r, and nipple s, to the bolt Q, which is connected to conductor K of the lamp, and the lamp now being in a closed circuit of nitrogen gas, the operation of purification begins. The gas passes slowly from receiver Y through the tube p, thence through the tube J to the top of the lamp at the point u, and thence down and outward at the point t into the receiver Y', and from Y', by the reverse action, it is repassed into receiver Y. This transference is repeated until there is no further evidence of oxidization, when, the receiver Y' being empty, a pressure is exerted upon the receiver Y, and maintained so as to cause a slight escape of gas from the lamp during the time that Y' is disconnected and the binding-post being put onto the bolt Q, connecting with conductor K. The nipple s is lastly disconnected from the bolt Q of tube J, and the binding-post for that tube put on, when the lamp is ready for use, and will remain so for an indefinite period, the lime S in the lamp absorbing any traces of carbonic-acid gas that may be present or evolved, and the sodium or potassium burning out any traces of oxygen that may enter during the closing of tube J.

By the process described the lamp may be charged with absolutely pure nitrogen gas; and it is clear that any number of lamps may be placed in the circuit and simultaneously charged, the gas, in transference, passing *seriatim* through the lamps.

Having thus fully described our invention, what we claim as such, and desire to secure by Letters Patent, is—

1. An electric lamp in which the globe and stopper, both of glass or other vitreous substance, are ground together and held together by a clamping device.

2. In an electric lamp, the combination, with suitable conductors of electricity, of an inclosing-globe provided with a rim or flange, A', forming an integral part of such globe, as and for the purpose specified.

3. The combination of the vitreous globe A of an electric lamp and the cushion P, placed, as shown and described, above the vitreous flange thereof, for the purpose of supporting a clamping device.

4. The combination of the vitreous globe A of an electric lamp and the cushion N, placed, as shown and described, under the stopper thereof, for the purpose of supporting a clamping device.

5. The combination of the globe of an electric lamp and the two cushions N and P, placed as shown and described, for the purpose of supporting a clamping device.

6. In an electric lamp, a tube-bolt, Q, and binding-post $n$, in combination with a packing, $l$, under said binding-post.

7. In an electric lamp, a tube-bolt, Q, nut $m$, binding-post $n$, and packings $l\ l\ l$.

8. The combination of the clamp G and the cross-piece $g$, as and for the purpose specified.

9. In an electric lamp, a tube leading from an external connection to or near to the top of the globe, and having an opening thereat, in combination with an opening at or near to the base of the globe, for the purpose of facilitating the filling of the globe with a carbon-preservative atmosphere, substantially as shown and described.

10. In an electric lamp, two unobstructed tubes leading from external connections into the globe thereof, and so arranged as to facilitate the charging of the globe with a carbon-preservative atmosphere.

11. In an electric lamp, a diaphragm obstructive of radiant heat interposed between the luminous part or parts of such lamp and the air-tight joint or joints thereof, as and for the purpose specified.

12. An electric lamp within which the conductors leading from the air-tight joint or joints thereof to the luminous part or parts thereof are so formed, lengthened, or broadened as to have great radiating-surface, so that conduction of heat from such part or parts to such joint or joints is in great measure, if not wholly, prevented.

13. In an electric lamp, the long coiled conductor J, opening at its upper end, and connecting with one electrode of such lamp.

14. In an electric lamp, the long coiled conductor K, opening at the base of such lamp, and connecting with one electrode thereof.

15. In an electric lamp, an absorbent of carbonic-acid gas.

16. In the sealed globe of an electric lamp containing an azotic or other carbon-preservative atmosphere, an absorbent of carbonic-acid gas.

17. In an electric lamp, an agent having a great affinity for oxygen, whose oxidization produces a solid unalterable by the natural heat in the lamp, such as sodium or potassium.

18. The combination, in an electric lamp, of an absorbent of carbonic-acid gas and an agent having a great affinity for oxygen, whose oxidization produces a solid unalterable by the natural heat in the lamp, such as sodium or potassium.

19. A carbon rod, piece, or pencil heated to incandescence in an atmosphere deprived of oxygen, in which atmosphere is permanently an oxidizing agent whose oxidization produces a solid, which agent may be sodium or potassium, or other readily-oxidizable metal.

20. A carbon rod, piece, or pencil heated to incandescence in an atmosphere deprived of oxygen, in which atmosphere is permanently an absorbent of carbonic-acid gas.

21. A carbon rod, piece, or pencil heated to incandescence in an atmosphere deprived of oxygen, in which atmosphere is permanently an oxidizing agent, such as sodium, potassium, or other readily-oxidizable metal, in combination with an absorbent of carbonic-acid gas.

22. A sealed electric lamp inclosing an agent or agents for purifying the atmosphere contained therein from oxygen or oxygenic gases.

23. The herein-described method of charging an electric lamp with a carbon-preservative atmosphere, consisting in placing the lamp in the circuit of a purifying agent or agents and two gas-receivers, one of which is primarily preferably filled with the carbon-preservative gas and the other empty, and forcing the gas back and forth from one receiver to the other, each time through the lamp and the purifying agent or agents, until the atmosphere becomes pure, or nearly so.

24. The herein-described method of charging an electric lamp with a carbon-preservative atmosphere, consisting in placing the lamp in a circuit of a purifying agent or agents and two receivers, one of which is primarily preferably filled with a gaseous medium and the other empty, and forcing the gaseous medium back and forth from one receiver to the other, each time through the lamp and the purifying agent or agents, until the atmosphere in the lamp becomes pure, or nearly so.

25. The method of charging an electric lamp with a carbon-preservative gas by intermittently passing a purified atmosphere, or an atmosphere undergoing purification, into the globe thereof, and thereby successively diluting and purifying the contents thereof, until finally all or nearly all the oxygen is removed therefrom.

WILLIAM EDWARD SAWYER.
ALBON MAN.

Witnesses:
WM. H. CHURCH,
GEORGE H. PORTER.